Patented Jan. 16, 1945

2,367,380

UNITED STATES PATENT OFFICE 2,367,380

CHEWING GUM MATERIAL

George Spiller, Wilmington, Del., assignor to Hercules Powder Company, Wilmington, Del., a corporation of Delaware No Drawing. Application October 3, 1942, Serial No. 460,687

13 Claims. (Cl. 99—135)

This invention relates to chewing gum and, more particularly, it relates to a new chewing gum base.

It has for a long time been desirable to find a chewing gum base to replace chicle wholly or in part. Chicle is expensive and there is no readily available source of supply. In addition, chicle deteriorates somewhat upon aging. The supply and quality are subject to the uncertainties attendant on importation.

Bases which have been tried have been variously objected to. Among the disadvantages complained of in gums using these substituted bases were: a tendency to deteriorate upon aging, bringing about undesired flavors, drying out upon the passage of time rendering the gums too hard to chew, and inability of the gums to retain flavors. However, the chief disadvantage of synthetic bases is their lack of the peculiar type of crunchiness in chewing which makes chicle unique and which is demanded in a high quality chewing gum.

Now in accordance with this invention a base has been found which makes it possible to produce a chewing gum which, in large measure, overcomes the objections to previously known chewing gums comprised of chicle bases and substitutes therefor and which has the desired characteristic, pleasant crunchiness. This chewing gum base comprises, as the ingredient providing the crunchy effect, a crystalline adduct of a rosin or rosin ester and maleic anhydride or maleic acid. The adduct is formed by an addition reaction of the maleic group with a rosin acid group, the rosin acid group functioning in the same way whether in free acid form as in rosin or in esterified form as in a rosin ester.

The adduct may be prepared in one of two ways. One way is to react the rosin or rosin ester and maleic anhydride or maleic acid together at elevated temperatures and then precipitate out the adduct in the crystalline form by the use of an aliphatic hydrocarbon such as naphtha. The other method is to react the rosin or rosin ester in the presence of the naphtha or of some other high boiling aliphatic hydrocarbon held at an elevated temperature. The adduct is crystallized out of solution by cooling.

Having indicated in a general way, the nature of this invention, the following examples are given to more fully illustrate the preparation of chewing gum bases and chewing gums in accordance with the invention.

Example 1

A chewing gum base in the form of crystalline adduct of a rosin ester and maleic acid was first prepared as follows:

Thirteen thousand four hundred and forty grams of a liquid methyl ester of abietic acid, 2,548 grams of maleic anhydride and 416 grams of methyl alcohol were placed in a 6-gallon aluminum kettle fitted with a thermometer, a carbon dioxide inlet tube, and a steam condenser set in reflux position, and were heated at 200° C. for 5 hours. The reaction product so produced was allowed to cool to 100° C. and was then cut into petroleum ether to make a total volume of 10 gallons. The mixture was then allowed to stand overnight. The yield of the adduct which crystallized out of the mixture was 2700 grams. From this adduct, a chewing gum base was prepared as follows:

The 2700 grams of the adduct were added to 1300 grams of a rubber composition consisting of 7 parts of balata, 20 parts of milled rubber, and 5 parts of carnauba wax. The rubber composition and the adduct were blended together by melting them at 130° C. The blended mixture was then allowed to cool to about 80–90° C. and 4% of water was added. The resulting material was rolled into sheets and allowed to age for two days.

Example 2

An adduct was first prepared by refluxing for eight hours at 170° C. 720 grams of the liquid methyl ester of abietic acid used in Example 1, 147 grams of maleic anhydride, 867 grams of V. M. & P. naphtha, and 0.87 gram of iodine. The solution obtained from the heating process was allowed to cool to 50° C., at which point the desired rosin ester-maleic adduct crystallized out of the solution. The crystalline adduct was filtered and prepared into a chewing gum base in the same manner as described in Example 1.

Example 3

Seven hundred and fifty-five parts of N wood rosin, 122.5 parts of maleic anhydride, 0.88 part of iodine and 877 parts of a light petroleum hydrocarbon solvent were refluxed at 170° C. for three hours. The solution formed is allowed to cool to 50° C. By filtration, 350 parts of the crystalline addition product of rosin and maleic anhydride were obtained.

Two hundred and seventy parts of the above adduct were added to 130 parts of a rubber composition consisting of 7 parts of balata, 20 parts of milled rubber and 5 parts of carnauba wax. The rubber composition and the adduct were blended together by melting them at 130° C. The blended mixture was then allowed to cool to about 80–90° C. and 4% of water was added and worked in. The resulting material was rolled into sheets and allowed to age for two days.

The rosin used in preparing the adduct in accordance with this invention may be a wood rosin or a gum rosin. It may have been refined by any of the processes well known to the art, such as distillation, extraction with selective solvents for color bodies, fractionation to raise the rosin acid content, heat treatment for example at 250-350° C., or otherwise modified by partial polymerization, partial disproportionation, or by partial hydrogenation or dehydrogenation, or both, to form a rosin capable of reacting with maleic anhydride. Generally speaking, the more purification the rosin has undergone in the direction of raising the rosin acid content, the better the yield of crystallized rosin-maleic adduct that will be obtained from the process in accordance with this invention. Pure rosin acids are suitable for preparing the adduct. The term "rosin acid" applied to an adduct will be understood to include rosins or purified rosin acid forms.

The rosin ester from which the adduct may be produced in accordance with this invention may be an ester of any rosin or modified rosin such as those mentioned and an alcohol. Such esters may be derived, for example, from methyl alcohol, ethyl alcohol, propyl alcohol, isopropyl alcohol, benzyl alcohol, ethylene glycol, and the like. Esters of lower aliphatic monohydric alcohols are preferred. The term "rosin acid esters" will be understood to be inclusive of esters prepared from rosin or purified rosin acids obtained from rosin.

The maleic adduct may be as obtained by reaction of the rosin acid or ester with maleic acid or with maleic anhydride or it may be as modified by subsequent derivative formation, i. e., esterification, salt formation, etc. It will in all cases be crystalline.

In place of the rubber composition with which the adduct was mixed in the examples in preparing a chewing gum base in accordance with this invention, compositions of similar nature, containing other rubber type gums, may be used. The wax may be omitted or replaced by other waxes. Thus, in place of the carnauba wax used in the examples, montan wax, microcrystalline mineral wax, paraffin wax, beeswax, Japan wax, spermaceti, ozokerite, ceresin, and synthetic waxes may be used. In place of the balata or of the rubber or both, any rubber may be used. Such rubbers as, for example, crepe rubber, rubber latex, gutta percha, gum tuno, Namaqualand rubber (from *Euphorbia drageana*), almeidina or Euphorbia gum, abba rubber, and inferior guttas such as, gutta siak, gutta cotie, gutta kay, gutta hangkang, gutta jangkar, gutta sundik, gutta soh, gutta susu, gutta penang, yellow gutta, or synthetic rubbers such as polymers or copolymers derived from butylene or butadiene or their derivatives, gelled or semi-gelled or related materials or mixtures of the foregoing materials are suitable. Where rubbers low in resinous components are used, resin may be added or a rubber containing resinous component, e. g., a resin-containing gum, such as balata, a gutta or other low grade rubber, may be used. Resins such as hydrogenated rosin, pentaerythritol abietate, polymerized rosin, hydrogenated ester gum, hydrogenated coumarone resin, etc., may serve as the resin-containing gum, replacing or supplementing the low grade rubber. Chicle may be employed with or without a rubber, in such cases using less of the adduct.

In addition to the adduct and the rubber or rubber composition ingredients of chewing gums prepared in accordance with this invention, any of the various flavoring or modifying ingredients commonly contained in chewing gums may be used. Thus, there may be incorporated with the materials making up the chewing gum from the base, an oily softening agent, such as petrolatum, beef stearin, vegetable oil, such as cottonseed oil, olive oil, etc., petroleum oil, such as, water white mineral oil and the like, or hydrogenated vegetable oil, such as hydrogenated cottonseed oil which is solid at room temperature. Sweetening agents may be the usual mixture of powdered sugar and glucose syrup, or other agents, such as invert sugar, levulose, saccharin. The usual flavoring ingredients, such as oil of peppermint, spearmint, wintergreen, licorice, vanilla, etc., may be employed. The absence of chicle in most of the chewing gums prepared in accordance with this invention makes it possible to incorporate cocoa powder or cocoa syrup which may be both sweetening and flavoring agents. These desirable flavors cannot be obtained in chicle base chewing gums as the chocolate breaks down the chicle and causes the gum to become "soupy." Small amounts of suitable filler materials such as, clay, calcium carbonate, magnesium carbonate, magnesium oxide, barium sulfate, calcium sulfate, carbon black; or dentifrices and medicants such as activated charcoal, activated carbon, phenolphethalein, and mannitol, may be included.

It is frequently desirable to incorporate small amounts of water into the chewing gum. This is particularly desirable where the rubber component is in the solid form. The admixture of water in the composition gives it a desirable consistency and ease of manufacture. Ordinarily, the amount of water will not exceed 10% of the weight of the chewing gum, but when the rubber component is introduced in the form of an aqueous dispersion, the water content may be as high as 35%.

In preparing the rosin or rosin ester-maleic adduct in accordance with this invention, the proportion of maleic group to rosin or rosin ester may vary between about $\frac{1}{20}$ mol and about 1 mol of maleic group (preferably between about $\frac{1}{4}$ mol to about $\frac{3}{4}$ mol) for each mol of the rosin or rosin ester considered on the basis of the abietic or other rosin acid content. In incorporating the adduct into a chewing gum base, the proportion of adduct may vary from about 10% to about 90% and usually from about 25% to about 75% of the base, the remaining being a rubber or rubber composition. The composition of the rubber composition may also vary widely. Thus, based on a total of 20 parts of a rubber composition, the content of rubber may vary from about 4 parts to about 18 parts, and preferably from about 8 parts to about 16 parts; the content of waxy ingredient may vary from about $\frac{1}{2}$ parts to about 8 parts and preferably from about 1 part to about 5 parts and the content of a resinous rubber type gum where used may vary from about $\frac{1}{2}$ part to about 10 parts and preferably from about 1 part to about 7 parts.

If an oily softening agent is included, it should be present in a limited amount, say, not over 15% of the weight of the total chewing gum base. Excessive amounts of the oil will impart objectionable oily characteristics to the chewing gum.

When the crystalline adduct, prepared in accordance with this invention, is blended with the other ingredients of the chewing gum base, the compounding usually causes the mixture to become amorphous throughout. However, after the chewing gum is shaped and allowed to age for ½ day to 10 days the crystalline nature of the adduct returns and imparts to the chewing gum the desirable, pleasant crunchiness. It will be appreciated that the crystals are very small and very uniformly distributed, sometimes being difficult to discern under high magnification. Usually the adduct also behaves in part as a resin in the composition.

The components of the chewing gum base are intermingled with one another in any manner which gives a homogeneous intimate mixture. The method of compounding will depend upon the form in which the several components are introduced. The rubber composition and the rosin-maleic adduct may be admixed with each other by heating and stirring them together for a prolonged period of time at a temperature at which they are fluent. If other components are employed, such as fillers, oils, medicaments, dentifrices, sweeteners, etc., these other components may be commingled with the principal ingredients in the same manner. It has been found advantageous to effect the intermixture by working the mixture on a roll mill at temperatures below the melting point of the resinous and rubbery ingredients, passing it through the rolls a number of times until the desired degree of intermixture is effected. Such a method produces chewing gums which are superior to those which are compounded at higher temperatures. It is most easily carried out when the rubber ingredient of the chewing gum being compounded is in the milled form as in the examples. Where the composition includes no solids, the rubber ingredient being in the form of an aqueous dispersion, the components may be mixed at room temperature, heat being later applied for the purpose of evaporating the water initially present in the composition.

Chewing gums made with the base prepared in accordance with this invention are improved over chewing gums prepared from other resinous bases in their chewing characteristics. The adduct has the peculiar property of blending with the rubber composition at elevated temperatures into a very uniform amorphous mass and then, over a period of aging, forming microscopic and submicroscopic uniformly distributed crystals in the matrix.

Also, because these chewing gums do not require any chicle, or permit a considerable reduction in chicle content, they are much less expensive to produce than are chicle-containing chewing gums.

Chewing gums prepared in accordance with this invention chew with an even, regular consistency regardless of the rate at which they are chewed. In addition, these chewing gums may be stored for long periods of time before they are sold. Aging properties are improved over other bases and in addition, the crystals do not disappear but increase slightly upon aging of the chewing gum.

What I claim and desire to protect by Letters Patent is:

1. A chewing gum material comprising a crystalline maleic adduct of a rosin compound selected from the group consisting of rosin acids and rosin acid esters and a gum selected from the group consisting of chicle and rubbers.

2. A chewing gum material comprising a crystalline maleic adduct of a rosin compound selected from the group consisting of rosin acids and rosin acid esters and a rubber.

3. A chewing gum material comprising a crystalline maleic adduct of a rosin compound selected from the group consisting of rosin acids and rosin acid esters, and a resin-containing rubber composition.

4. A chewing gum material comprising a crystalline maleic adduct of a rosin compound selected from the group consisting of rosin acids and rosin acid esters, a rubber, a wax, and a resin-containing gum.

5. A chewing gum material comprising a crystalline maleic adduct of a rosin compound selected from the group consisting of rosin acids and rosin acid esters, combined with a rubbery resinous milled rubber, a wax, and a resin-containing gum.

6. A chewing gum material comprising a crystalline maleic adduct of a rosin compound selected from the group consisting of rosin acids and rosin acid esters, milled rubber, carnauba wax, and balata.

7. A chewing gum material comprising a crystalline maleic adduct of a monohydric alcohol ester of rosin acid and a gum selected from the group consisting of chicle and rubbers.

8. A chewing gum material comprising the crystalline adduct of maleic acid and the methyl ester of abietic acid and a gum selected from the group consisting of chicle and rubbers.

9. A chewing gum material comprising the crystalline adduct of maleic acid and the methyl ester of abietic acid combined with a composition comprising milled rubber, carnauba wax, and balata.

10. A method for preparing a chewing gum material which comprises dispersing a crystalline maleic adduct of a rosin compound selected from the group consisting of rosin acids and esters of rosin acids in chewing gum ingredients including a rubber at temperatures leading to the formation of a uniform amorphous mixture, and permitting the mixture to age until very small crystals form therein.

11. A method for preparing a chewing gum material which comprises dispersing a crystalline maleic adduct of a rosin acid in chewing gum ingredients including a rubber at temperatures leading to the formation of a uniform amorphous mixture, and permitting the mixture to age until very small crystals form therein.

12. A method for preparing a chewing gum material which comprises dispersing a crystalline maleic adduct of a rosin acid ester of methyl alcohol in chewing gum ingredients including a rubber at temperatures leading to the formation of a uniform amorphous mixture, and permitting the mixture to age until very small crystals form therein.

13. A method for preparing a chewing gum material which comprises dispersing chewing gum ingredients including rubber, a wax, and balata with a crystalline maleic adduct of methyl abietate at an elevated temperature to form a uniform amorphous mixture, and permitting the mixture to age until very small crystals form therein.

GEORGE SPILLER.